Feb. 27, 1934.      J. L. DRAKE      1,948,566
MACHINE FOR SEALING LAMINATED GLASS
Filed March 16, 1929      3 Sheets-Sheet 2
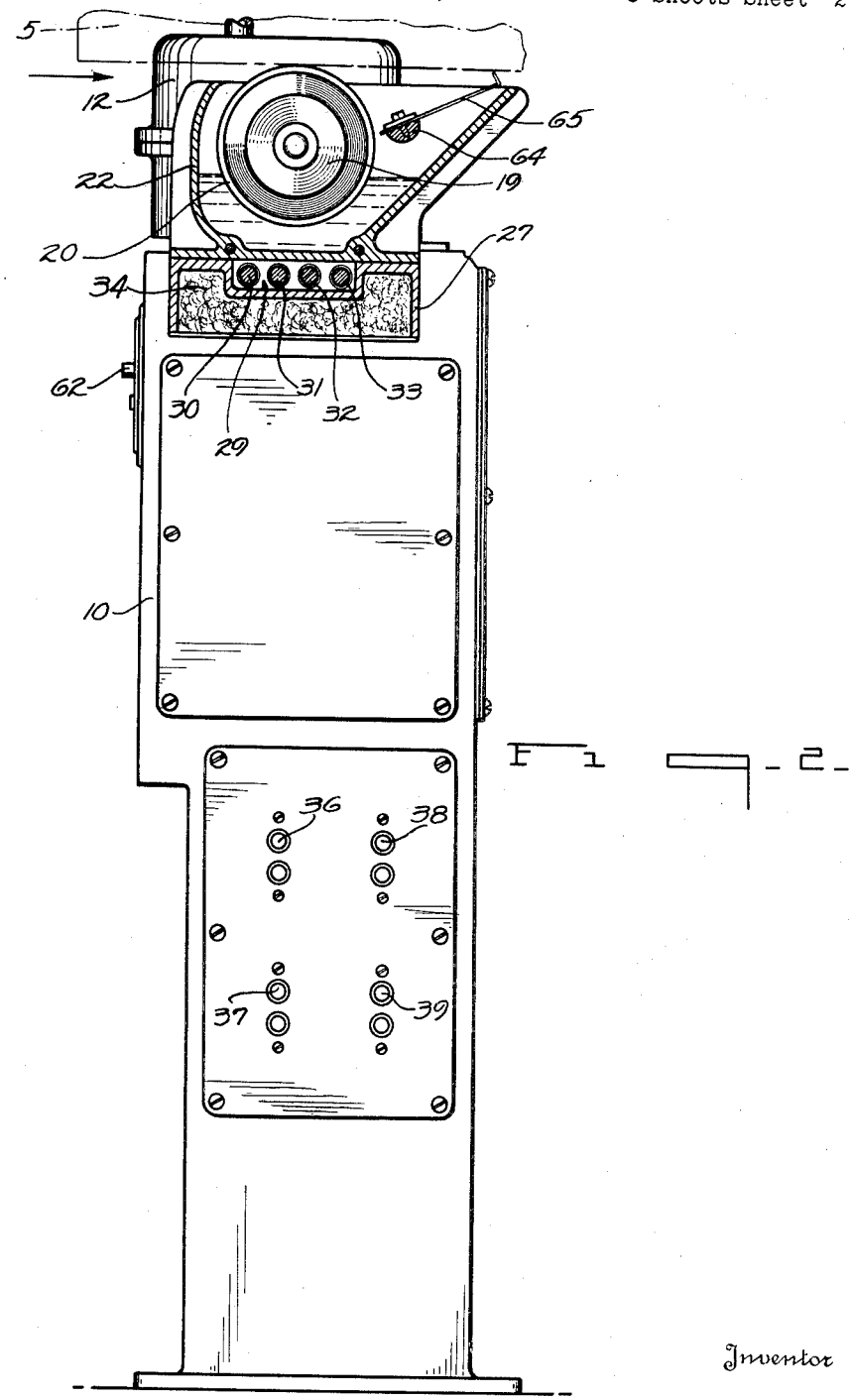
Inventor
John L. Drake
By Frank Fraser
Attorney

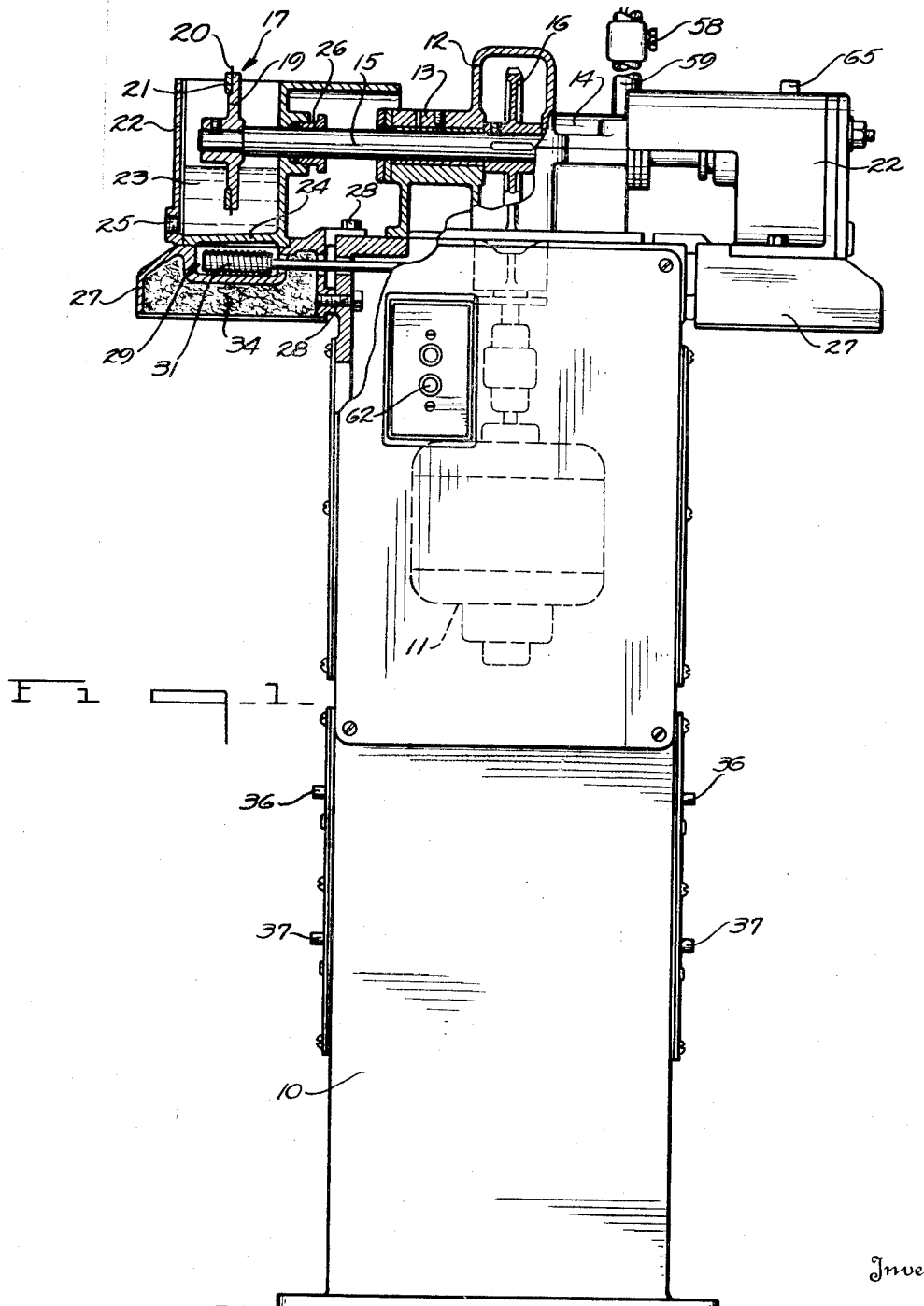

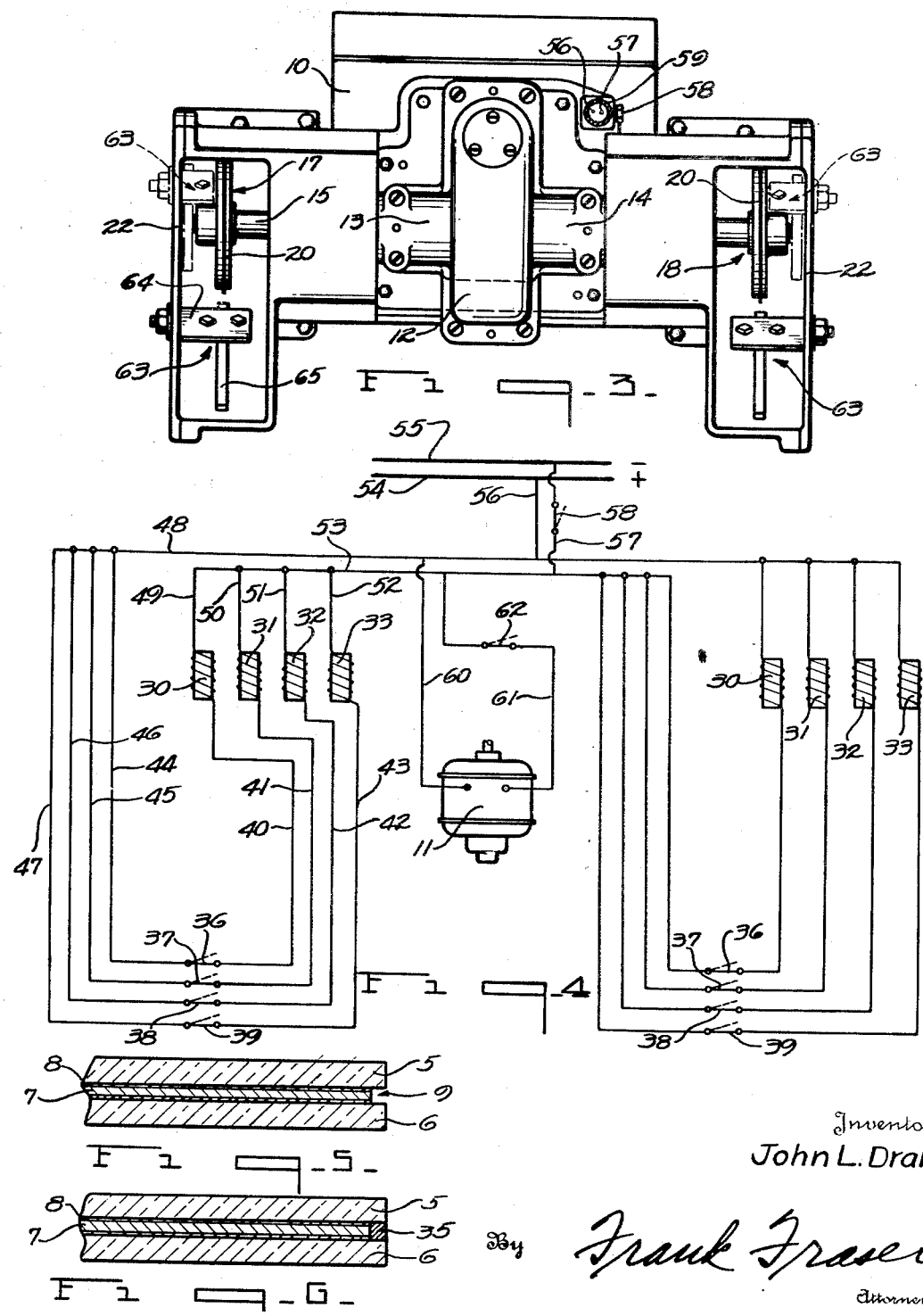

Patented Feb. 27, 1934

1,948,566

UNITED STATES PATENT OFFICE 1,948,566

MACHINE FOR SEALING LAMINATED GLASS

John L. Drake, Toledo, Ohio, assignor to Libbey-Owens-Ford Glass Company, Toledo, Ohio, a corporation of Ohio Application March 16, 1929. Serial No. 347,559

3 Claims. (Cl. 49—81)

The present invention relates generally to the manufacture of laminated or composite glass and more particularly to an improved apparatus or machine for effecting the sealing or luting of the edges thereof so as to protect the bond between the laminæ and render the same impervious to the atmosphere.

According to this invention, the sealing or luting of the edges of a laminated sheet is effected by the use of a tool in the form of a wheel or disc rotatable preferably about a substantially horizontal axis and having the lower portion of its periphery immersed within a suitable sealing material or liquid. The sheet is then held in a substantially vertical position and moved along in engagement with the upper portion of the periphery of the tool, the said tool being adapted, upon rotation, to pick up the sealing material or liquid and feed it into place in the sheet edge.

One of the objects of the present invention is the provision of a sealing machine of improved construction embodying a plurality of working or sealing tools operable simultaneously and preferably from a single source of power to the end that a plurality of laminated sheets may be simultaneously sealed by the single machine.

Another object of the invention resides in the provision of novel means for heating the sealing materials or liquid to and maintaining it at a desired substantially constant and uniform temperature, said heating means being preferably in the form of electric resistance units with means for individually controlling the same to effect the desired heating of the sealing material.

A further object of the invention involves the provision of novel means for controlling the operation of the working tools and heating units including preferably a master switch connected in series therewith whereby the tools may be stopped and all of the heating units simultaneously shut off in a case of emergency or for any other reason.

Other objects and advantages of the invention will become more apparent during the course of the following description when taken in connection with the accompanying drawings.

In the drawings forming a part of this application and wherein like numerals are employed to designate like parts throughout the same, Fig. 1 is a front elevation, partially in section, of a sealing machine constructed in accordance with the present invention.

Fig. 2 is a side elevation thereof also partly in section.

Fig. 3 is a top plan view thereof.

Fig. 4 is a diagram of the electrical wiring for the machine.

Fig. 5 is a sectional view of a sheet of laminated glass prior to sealing, and

Fig. 6 is a similar view subsequent to sealing.

As shown in Fig. 5, laminated sheet glass ordinarily consists of two sheets of preferably transparent glass 5 and 6 between which is interposed a sheet or membrane 7 of some suitable non-brittle material joined or bonded to the glass sheets by any suitable solvent, adhesive or the like 8 whereby to create a composite structure. The surfaces of the glass sheets may or may not be ground and polished as desired and it is to be understood that the present invention is not to be restricted to any particular type of laminated glass, the materials used in its structure or the process of laminating.

The practicability and commercial value of the laminated sheet is dependent largely upon the quality and permanency of the bond between the laminations. Therefore, in order to protect the bond and render the same impervious to the atmosphere, the practice of sealing or luting the edges of the laminated sheet is sometimes followed. This sealing may be accomplished by first providing a continuous channel or groove 9 around the edges of the laminated sheet between the adjacent sheets of glass and in then filling in this channel or groove with a suitable sealing or luting material. This channel or groove may be formed by uniting the glass sheets with a slightly smaller sheet of non-brittle material or the sheet of non-brittle material may be initially as large as the glass sheets and then subsequently cut back from the edges of the glass sheets to form the channel or groove.

The machine herein provided and illustrated in the drawings for sealing or luting the sheet edges comprises a vertical supporting housing 10 within which is mounted the motor or prime mover 11. Supported upon and secured to the upper end of housing 10 is a head 12 provided with a pair of spaced substantially horizontal bearings 13 and 14 within which is journaled the horizontal operating shaft 15. Keyed upon shaft 15, between bearings 13 and 14, is a worm gear or the like 16 driven from the motor 11 through suitable driving connections (not shown). Carried at the outer ends of shaft 15 are the working or sealing tools 17 and 18 respectively, each tool comprising a disc or wheel 19 having an annular reduced portion at the periphery thereof against which is fitted the sealing element or ring 20 removably secured in place by a nut or washer 21. The sealing wheel 19 consists of a relatively thin metallic disc, the upper portion of which is adapted to be received within the groove to be sealed or luted during the sealing operation.

The sealing tool at each end of the operating shaft is received within a receptacle 22 containing a supply of sealing material or liquid 23. The lower portion of the periphery of the sealing ring 20 is immersed within the sealing liquid while the upper portion of its periphery projects upwardly and preferably slightly beyond the top of the receptacle. The bottom 24 of receptacle 22 inclines downwardly and outwardly to a drain opening closed by a plug 25 to allow for the draining out of the sealing liquid when desired. The shaft 15 extends through the inner side wall of the receptacle and is surrounded by a packing gland 26.

The receptacle 22 at either side of the machine is carried upon a horizontal bracket or support 27 secured to housing 10 by bolts or other fastening means 28. Formed in the upper surface of the support 27 is a recess 29 within which is disposed a plurality and, as herein shown, four electric heating elements or units 30, 31, 32 and 33 although a greater or less number may be used as preferred. These heating units extend transversely beneath the receptacle 22 and are provided to heat up the sealing liquid and to maintain the same at a desired substantially constant and uniform temperature. The support 27 is also preferably hollow and adapted to contain suitable insulating material 34.

In the operation of the machine as thus far described, a desired amount of sealing liquid 23 is first placed within the receptacle 22 at each side of the machine and is then heated to a desired temperature by means of the electric heating units. The sealing liquid is not intended to entirely fill the receptacle but, on the other hand, the amount must be sufficient so that the lower portion of the periphery of the sealing ring will be immersed therein. The motor 11 is then placed in operation to effect a driving of the shaft 15 which in turn causes simultaneous rotation of the sealing tools 17 and 18 in the same direction. The laminated sheet is then placed in a vertical position with the edge to be sealed at the bottom thereof or, otherwise stated, facing downwardly. The sheet is then passed horizontally in the direction indicated by the arrow in Fig. 2 and the sealing ring 20 is adapted to be received within the groove 9 to be sealed. As the sheet is then moved along over the rotating ring, the said ring will function to pick up the sealing liquid within the receptacle and carry it upwardly into the groove or channel of the sheet. Thus, it will be apparent that the sealing operation can be readily carried out in a convenient and efficient manner and that by providing two sealing tools, two sheets can be simultaneously sealed, a separate operator being of course provided to take care of each sheet. In Fig. 6, the laminated sheet is shown after sealing and the seal in the sheet edge is designated 35.

The electrical wiring for the sealing machine is more clearly illustrated in Fig. 4 from which it will be seen that the electric heating units 30, 31, 32 and 33 at each side of the machine are provided with and adapted to be independently controlled by means of the separate switches 36, 37, 38 and 39 respectively which may be of the usual push button type and connected thereto by wires 40, 41, 42 and 43. Upon operation of any one of the switches 36 to 39 at either side of the machine, the desired heating unit or units may be turned off or on independently of one another. This is desirable for the reason that when the sealing liquid is first placed within the receptacle 22 or after it has stood therein for sometime such as for example, over night, a relatively greater amount of heat will be required to soften the same and bring it quickly to the desired temperature and when this is required all of the heating units may be used so that the sealing liquid may be brought to the desired temperature as rapidly as possible. After the sealing liquid has reached the desired temperature however, only one or two of the units may be required to maintain it at such temperature and the others can therefore be shut off.

Running from the switches 36 to 39 are the wires 44, 45, 46 and 47 respectively connected to the lead wire 48 while leading from the electric units 30 to 33 are the wires 49, 50, 51 and 52 respectively connected to the lead wire 53. The numerals 54 and 55 indicate the plus and minus main lines, the lead 48 being connected to main line 54 by wire 56 and the lead 53 connected to main line 55 by wire 57 within which is interposed the master switch 58. The master switch is provided since it may be found desirable at times such as in a case of emergency or when making repairs to the machine or for any other reason that all of the electric heating units be simultaneously shut off by the opening of a single switch and to obviate the necessity of individually closing each of the switches 36 to 39 at each side of the machine. The master switch is preferably carried at the upper end of the conduit 59 where it is within easy reach of the operator, the wires 56 and 57 leading upwardly through this conduit to the main lines 54 and 55. Upon opening of the switch 58 it will be apparent that the circuit through all of the electric units will be simultaneously broken and the individual switches 36 to 39 rendered ineffective even though closed.

Leading from the motor 11 are the two wires 60 and 61 connected with the lead wires 48 and 53 respectively. Interposed within the wire 61 is the motor switch 62 which may also be of the push-button type. Thus, the motor is connected in series with the electric heating units and the master switch 58 so that upon opening of switch 58 to shut off the heating units, the motor 11 will be simultaneously shut off to stop rotation of shaft 15 and both sealing tools 17 and 18. Thus, when the switch 58 is open no electric current at all will pass to the machine.

For the purpose of cleaning or scraping the edges of the laminated sheet to remove therefrom any surplus sealing material, scraping means 63 may be associated with each tool 17 and 18. Each scraping means embodies a bracket member 64 secured to one side wall of the receptacle 22 and carrying the scraping finger 65. This scraping finger, as indicated in the full lines in Fig. 3, may be positioned directly in line with the sealing tool so that after the sheet passes over the tool the edge sealed will pass over and in engagement with the scraping finger which will function to scrape any surplus sealing material therefrom and thus clean the edge of the sheet. If desired, however, the scraping means may be arranged in the position indicated by the broken lines in Fig. 3 to one and preferably the outer side of the sealing tool so that the sheet is first passed rapidly over the sealing tool and then back and over the scraping member.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A machine for sealing the edges of laminated sheet glass, including a housing, a horizontal shaft rotatably carried thereby, a sealing wheel mounted upon said shaft, a receptacle within which the sealing wheel is disposed, said receptacle adapted to contain a sealing liquid within which the sealing wheel is immersed, a hollow bracket carried by the housing for supporting the receptacle, said bracket having a recess in its upper surface, electric heating means disposed within said recess and positioned beneath the receptacle and insulating means within said hollow bracket beneath said heating means.

2. A machine for sealing the edges of laminated sheet glass, including a vertical housing, horizontally spaced bearings carried at the upper end of said housing, a horizontal shaft journaled in said bearings, a motor carried by the housing and having driving connections with said shaft between said bearings, a sealing wheel mounted upon the shaft adjacent each end thereof, a receptacle for each sealing wheel, said receptacle adapted to contain a sealing liquid within which the respective wheel is immersed, hollow brackets carried by said housing for supporting said receptacles, each bracket having a recess in its upper surface, a plurality of electric heating units disposed within said recess, means for independently controlling the operations of said units, and insulating means disposed within the hollow brackets.

3. A machine for sealing the edges of laminated sheet glass having a groove or channel at the edge thereof, including a substantially horizontal shaft, means for driving said shaft, a sealing disc mounted upon the shaft, a receptacle adapted to contain a sealing material within which the sealing disc is immersed, said disc having a relatively thin edge to enter the groove or channel in the laminated sheet as the said sheet is passed horizontally thereover, and a stationary scraping member arranged in substantial horizontal alignment with the sealing disc and positioned substantially on a level with the top thereof, said scraping member providing a support for the laminated sheet as well as acting to remove any surplus sealing material from the edge thereof being sealed.

JOHN L. DRAKE.